United States Patent [19]

Komiya et al.

[11] Patent Number: 5,093,437
[45] Date of Patent: Mar. 3, 1992

[54] POLYAMIDE COPOLYMERS

[75] Inventors: Yukiatsu Komiya; Masao Ishida; Koji Hirai; Setuo Yamashita; Shinji Komori, all of Kurashiki; Takuji Okaya, Nagaokakyo, all of Japan

[73] Assignee: Kuraray Co., Ltd., Kurashiki, Japan

[21] Appl. No.: 593,254

[22] Filed: Oct. 1, 1990

Related U.S. Application Data

[63] Continuation of Ser. No. 146,477, Jan. 21, 1988, abandoned.

[30] Foreign Application Priority Data

| Jan. 22, 1987 | [JP] | Japan | 62-13455 |
| Mar. 6, 1987 | [JP] | Japan | 62-52270 |
| Mar. 6, 1987 | [JP] | Japan | 62-52272 |
| Aug. 25, 1987 | [JP] | Japan | 212171 |
| Dec. 7, 1987 | [JP] | Japan | 62-309992 |

[51] Int. Cl.$^5$ .............................................. C08L 7/00
[52] U.S. Cl. .................................... 525/440; 525/425; 525/438; 525/423; 525/430; 525/84
[58] Field of Search .................. 525/425, 440; 528/84

[56] References Cited

U.S. PATENT DOCUMENTS 4,129,715 12/1978 Chen et al. ............................ 528/67
4,448,937 5/1984 Bopp et al. ............................ 525/432
4,604,449 8/1986 Jackson et al. ...................... 528/288
4,649,180 3/1987 Chen et al. ............................ 525/462

FOREIGN PATENT DOCUMENTS 1467901 3/1977 United Kingdom .

OTHER PUBLICATIONS

Patent Abstracts of Japan, vol. 7, No. 61 (Mar. 15, 1983) & JP-A-57-207621.
Patent Abstracts of Japan, vol. 8, No. 218 (Oct. 4, 1984) & JP-A-59-102924.

*Primary Examiner*—Ana L. Carrillo
*Attorney, Agent, or Firm*—Oblon, Spivak, McClelland, Maier & Neustadt

[57] ABSTRACT

Novel polyamide copolymers having skeletons of a specific structure are disclosed. The polyamide copolymers have excellent resistance to hydrolysis, low temperature characteristics (low temperature softness), heat aging resistance and mechanical properties as compared to conventional polyamide copolymers. The polyamide copolymers also show excellent efficiencies in fabrication properties and transparency. In particular, the polyamide copolymers having a branched structure in the molecule thereof provide good results.

16 Claims, No Drawings

POLYAMIDE COPOLYMERS

This application is a continuation of application Ser. No. 07/146,477, filed on Jan. 21, 1988, now abandoned.

BACKGROUND OF THE INVENTION

1. Field of the Invention

The present invention relates to novel polyamide copolymers (hereafter sometimes simply referred to as polyamides) having excellent resistance to hydrolysis, low temperature characteristics (low temperature softness), heat aging resistance and mechanical properties and also having excellent efficiency in processabilities and transparency.

2. Prior Art Statement

Polyester polyamide copolymers obtained by reacting organic diisocyanates with dicarboxylic acids and methods for production thereof are already known as described in, for example, U.S. Pat. Nos. 4,087,481, 4,129,715 and 4,156,065, etc. It is well known that softness, elastic properties, mechanical properties, oil and chemical resistance and heat resistance are good in these copolymers.

However, these conventional polyester polyamide copolymers described above have poor transparency and temperature dependency of melt viscosity thereof is great and therefore, it was difficult to apply molding as in other general purpose thermoplastic resins to these copolymers. In addition, with these conventional polyester polyamide copolymers, problems also arise in resistance to hydrolysis and heat aging resistance.

For example, when polyester polyamide copolymers having a poor resistance to hydrolysis are prepared into films, their surfaces tend to be sticky in a relatively short period of time or cause cracking. Accordingly, the polyester polyamide copolymers are considerably limited upon use. The polyester polyamide copolymers of this kind have a limit in improving resistance to hydrolysis since they contain ester groups in more than a certain degree. On the other hand, the use of polyethers in place of polyesters results in extremely poor resistance to oxidative aging while resistance to hydrolysis is improved.

An object of the present invention is to provide novel polyamide copolymers having improved processabilities, transparency, resistance to hydrolysis, low temperature characteristics and heat aging resistance, without injuring the excellent heat resistance and mechanical properties of conventional polyester polyamide copolymers.

SUMMARY OF THE INVENTION

As a result of extensive investigations to achieve the foregoing object, the present inventors have surprisingly discovered that by a specific structural unit contained in the molecular thereof as a part of a soft segment in polyamide copolymers, polyamides which are excellent not only in resistance to hydrolysis, low temperature characteristics and heat aging resistance but also processability and transparency could be obtained and have come to accomplish the present invention.

DETAILED DESCRIPTION OF THE INVENTION

Namely, the present invention relates to a polyamide copolymer comprising repeating units represented by general formulae [I] and [II] described below wherein the polyamide copolymer contains a repeating unit of formula [II] in at least 10 mol % and the polyamide copolymer has a number average molecular weight of 5,000 to 250,000.

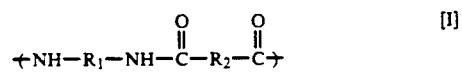

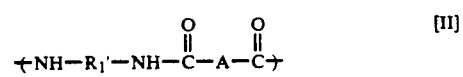

wherein $R_1$, $R'_1$ and $R_2$, which may be the same or different, each represent a hydrocarbon residue and A represents a segment containing at least one repeating unit selected from the group consisting essentially of general formulae [III], [IV], [V] and [VI] described below.

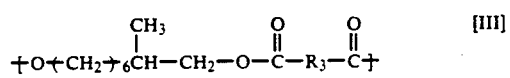

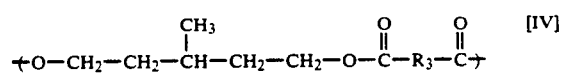

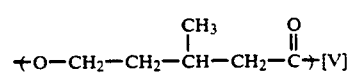

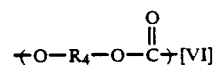

wherein $R_3$ and $R_4$, which may be the same or different, each represent a hydrocarbon residue.

In the present invention, the polyamide comprising repeating units represented by general formulae [I] and [II] can be obtained by a known method, for example, from an organic diisocyanate component and a specific dicarboxylic acid component but the raw materials are not limited thereto. The method for preparation can be performed in the presence or absence of an inert organic solvent and in the presence or absence of a catalyst. In this case, it is preferred that an equivalent weight ratio (NCO/COOH) of isocyanate to carboxyl group is between 0.97 and 1.03, more preferably between 0.98 and 1.02.

When the equivalent weight ratio is less than 0.97, a polymerization degree does not increase and good mechanical properties cannot be obtained. When the equivalent weight ratio exceeds 1.03, polymerization per se becomes difficult to occur.

In the polyamide copolymer of the present invention comprising repeating units represented by general formulae [I] and [II], $R_1$ and $R'_1$, which may be the same or different, each represents a hydrocarbon residue. Sources for compounds capable of giving such a hydrocarbon residue are not particularly limited but can be exemplified by organic diisocyanates. Representative examples of the organic diisocyanates are aromatic diisocyanates having 6 to 20 carbon atoms such as 4,4'-diphenylmethane diisocyanate, 2,4-tolylene diisocyanate, 2,6-tolylene diisocyanate, phenylene diisocyanate, 1,5-naphthylene diisocyanate, 3,3'-dichloro-4,4'-diphenylmethane diisocyanate, xylylene diisocyanate, tetramethylxylylene diisocyanate, etc.; aliphatic or alicyclic diisocyanates having 8 to 20 carbon atoms such as hexamethylene diisocyanate, isophorone diisocyanate, 4,4'-dicyclohexylmethane diisocyanate, etc.

It is preferred that $R_1$ and $R'_1$ are aromatic hydrocarbon residues having 6 to 20 carbon atoms in view of mechanical and physical properties and heat resistance Particularly preferred are aromatic hydrocarbon residues represented by general formulae:

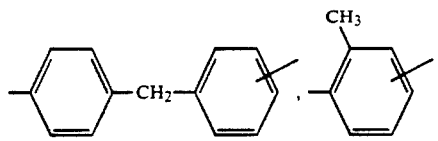

Further $R_1$ and $R'_1$ to one kind of hydrocarbon residue but may also contain two or more kinds of hydrocarbon residues.

In general formula [I], $R_2$ represents a hydrocarbon residue. Sources for compounds capable of giving $R_2$ are not particularly limited but representative examples are dicarboxylic acids. Specific examples include aliphatic dicarboxylic acids having 4 to 54 carbon atoms such as glutaric acid, adipic acid, azelaic acid, pimelic acid, sebacic acid, dodecanedioic acid, tetradecanedioic acid, a dimeric acid, etc.; aromatic dicarboxylic acids having 8 to 20 carbon atoms such as isophthalic acid, terephthalic acid, phthalic acid, naphthalene dicarboxylic acid, etc. As $R_2$, aliphatic hydrocarbon residues are preferred rather than aromatic hydrocarbon residues, in view of processabilities.

Further $R_2$ is not limited to one kind of hydrocarbon residue but may also contain two or more hydrocarbon residues.

In general formula [II], A is a segment containing at least one of repeating units represented by general formulae [III] through [VI]. It is essentially required that the repeating unit represented by general formula [II]is contained in 10 mol % or more, preferably 20 mol % or more, in the polyamide copolymer of the present invention. With less than 10 mol %, the object of the present invention cannot be sufficiently achieved. There is no particular upper limit of the content of unit [II] but preferably less than 60 mol %, more preferably less than 50 mol %. As the content of unit [II] in the polyamide copolymer increases, heat resistance becomes poor while softness and processabilities are improved.

Unit [III] is one derived from polyesters obtained from 2-methyl-1,8-octanediol and dicarboxylic acids. Unit [IV] is one derived from polyesters obtained from 3-methyl-1,5-pentanediol and dicarboxylic acids.

In general, polyesters containing units represented by general formula [III] or [IV] can be prepared from diols or ester forming derivatives thereof and dicarboxylic acids or ester forming derivatives thereof; for purpose of brevity, they are simply referred to as diols and dicarboxylic acids in the present invention.

The dicarboxylic acids to be used are not particularly limited but exemplified by aliphatic dicarboxylic acids and aromatic dicarboxylic acids. Examples of aliphatic dicarboxylic acids include dicarboxylic acids having 4 to 54 carbon atoms such as glutaric acid, adipic acid, azelaic acid, pimelic acid, sebacic acid, dodecanedioic acid, tetradeconedioic acid, a dimeric acid, etc. Examples of the aromatic dicarboxylic acids are dicarboxylic acids having 8 to 20 carbon atoms such as isophthalic acid, terephthalic acid, phthalic acid, naphthalene dicarboxylic acid, etc. The aliphatic dicarboxylic acids, especially aliphatic dicarboxylic acids having 4 to 12 carbon atoms are preferred. These carboxylic acids may be used singly or in combination.

Segment A may also contain repeating units of polyesters other than unit [III] or [IV]. These may be polyester units obtained from the same dicarboxylic acids as those constructing the aforesaid unit [III] or [IV] and other diols or may be polyester units quite different therefrom.

Preferred examples of the other diols are aliphatic or alicyclic diols such as ethylene glycol, propylene glycol, 1,4-butanediol, 1,6-hexanediol, 1,9-nonanediol, 1,4-cyclohexanediol, etc.

In the present invention, the polyester containing repeating unit [III] or [IV] can be prepared by a known process for preparing polyesters. However, in order to prepare the polyamide of the present invention, it is required for the polyester to contain reactive groups, for example, carboxyl groups, etc. at both ends thereof. Such a polyester containing carboxyl groups at the ends thereof (carboxyl-telechelic polyester) can be obtained, as an example, by reacting an excess of the aforesaid dicarboxylic acid with a diol component including 3-methyl-1,5-pentanediol. Alternatively, it is also possible to obtain the polyester by reacting a polyester diol containing hydroxy groups at both ends thereof with a dicarboxylic acid or an anhydrides thereof.

In the present invention, segment A may contain optional units other than those described above, within such a range that does not injure the effects of the present invention. These units may be polyester units containing polyalkylene glycols, for example, polyethylene glycol, polytetramethylene glycol, etc. as the diol component.

Upon preparation of the polyester, a catalyst for polycondensation may or may not be used. The catalyst for polycondensation may be used over a wide range and mention may be made of titanium compounds such as tetramethoxytitanium, tetraethoxytitanium, tetra-n-propoxytitanium, tetraisopropoxy-titanium, tetrabutoxytitanium, etc.; tin compounds such as di-n-butyl tin oxide, di-n-butyl tin dilaurate, dibutyl tin diacetate, etc.; combinations of acetates of magnesium, calcium, zinc, etc. and antimony oxide or the titanium compounds described above, etc. It is preferred that these catalysts are employed in a range of 5 to 500 ppm based on the whole copolymer polyesters.

In case that delicate coloration is to be avoided or ester exchange is wished to prevent, it is better that these catalysts would not be used.

In the present invention, it is preferred that a ratio of unit [III] or [IV] is 50 mol % or more. Particularly in the case of containing unit [III], the present invention has a characteristics that the effects can be sufficiently exhibited even though its ratio is small. A specific ratio of unit [III] in segment A may be sufficient in 5 mol % or more, preferably in 10 mol % or more.

Further in case that segment A contains unit [III], particularly advantageous results can be obtained when the polyester unit shown by formula [III] is used in combination with the polyester unit comprising other diols having 6 to 12 carbon atoms. Examples of these diols are aliphatic or alicyclic diols such as 1,6-hexanediol, 3-methyl-1,5-pentanediol, 1,9-nonanediol, 1,4-cyclohexanediol, etc.

In the combination of such diols, it is preferred that a ratio of unit [III] to other polyester units in segment A is in a range of 10/90 to 60/40. Especially when a polyester unit represented by general formula [X] obtained from 1,9-nonanediol and a dicarboxylic acid is contained within the above range, low temperature characteristics, resistance to hydrolysis and heat aging resistance of the obtained polyamides can be particularly improved.

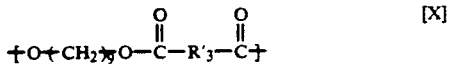

wherein R'$_3$ is a hydrocarbon residue which is the same as or different from R$_3$ described above.

2-Methyl-1,8-octanediol which is the diol component in formula [III] is often obtained in the form of a mixture as a side product of 1,9-nonanediol. Accordingly, when a source for giving segment A of the polyester containing polyester unit [III] having 2-methyl-1,8-octanediol as a component and polyester unit [X] having 1,9-nonanediol as a component is prepared, it is preferred to use the mixture directly.

In the present invention, unit [V] is a unit derived from a polyester obtained by ring opening polymerization of β-methyl-δ-valerolactone. Further segment A may also contain units of polyesters obtained by ring opening polymerization of lactones other than β-methyl-δ-valerolactone. As the other lactones mention may be made of, for example, β-propiolactone, pivalolactone, δ-valerolactone, ε-caprolactone, methy-ε-caprolactone, δ-caprolactone, etc.

In the present invention, it is preferred that a ratio of unit [V] in segment A is 30 mol % or more. As the ratio of unit [V] to be contained decreases, fabrication properties, resistance to hydrolysis and transparency become poor.

The polyester containing unit [V] can be prepared by ring opening polymerization of lactones in a conventional manner. For example, lactones can be subjected to ring opening polymerization in the presence or absence of a catalyst using a compound having activated hydrogen such as ethylene glycol, etc. as an initiator. Further, the ring opening polymerization can be performed without using any initiator. However, in the case of polymerizing without using any initiator or even in the case of polymerizing using the initiator, both ends of the polyester obtained vary depending upon its kind. These polyesters can be reacted with organic diisocyanates or the like in the form of, for example, carboxyl-telechelic polymers to produce the polyamide copolymers of the present invention.

In the present invention, unit [VI] is a divalent group obtained by removing the telechelic carboxyl groups from carboxyl-telechelic polycarbonates containing a unit:

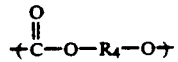

and its structure is represented, for example, by general formula [VII] described below:

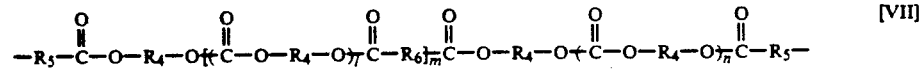

wherein l represents 0 or an integer of 1 to 100, m represents 0 or an integer of 1 to 100, n represents 0 or an integer of 1 to 100; R$_4$, R$_5$ and R$_6$, which may be the same or different, each represent a hydrocarbon residue; provided that when m is 1 or more, l and n are not 0 simultaneously and when m is 2 or more, l is not 0.

In formula [VII] described above, R$_4$ is a hydrocarbon residue from the diol in the polycarbonate. The diol used in the present invention is not particularly limited but one conventionally used upon preparation of polycarbonates and polyesters. Examples include aliphatic diols having 2 to 16 carbon atoms, for example, ethylene glycol, 1,4-butanediol, 2-methyl-1,3-propanediol, neopentylglycol, 3-methyl-1,5-pentanediol, 1,6-hexanediol, 2,2-diethyl-1,3-propanediol, 2-ethyl-1,3-hexanediol, 3,3'-dimethylolheptane, 1,9-nonanediol, 2-methyl-1,8-octanediol, 1,10-decanediol, etc. These diols may also be used as admixture of two or more.

However, when linear diols such as 1,4-butanediol, 1,6-hexanediol, 1,9-nonanediol, etc. are used as the diol components of polycarbonates, a defect of poor low temperature characteristics encounters because polycarbonates per se have a high solidifying point.

In order to improve the low temperature characteristics, it is preferred that branched aliphatic diols having 2 to 16 carbon atoms such as 3-methyl-1,5-pentanediol, 2-methyl-1,3-propane-diol, 2-methyl-1,8-octanediol, 2,2-diethyl 1,3-propanediol, 3,3'-dimethylolheptane, etc. are used together with linear diols having 2 to 16 carbon atoms such as 1,4-butanediol, 1,6-hexanediol, 1,9-nonanediol, etc. When 2-methyl-1,8-octanediol and 1,9-nonanediol . are employed in a molar ratio of 5/95 to 80/20,the low temperature characteristics, resistance to hydrolysis and heat aging resistance of polyamides obtained are particularly improved.

In the present invention, the effects can be exhibited by incorporating at least 30 mol % of unit [VI] in segment A.

The polycarbonates which can be used in the present invention are those containing carboxyl groups at both ends thereof. A method for preparing such polycarbonate is not particularly limited but a known method is applicable thereto. For example, there is a method in which polycarbonate diols are firstly prepared and then the ends thereof can be converted into carboxyl groups.

A method for preparing the polycarbonate diols is not particularly limited but a known method is applicable thereto. For example, the polycarbonate diols can be prepared by reacting glycols and carbonate compounds in an inert gas with heating under reduced pressure. Examples of the carbonate compounds which can be often used are diphenyl carbonate, diethyl carbonate, ethylene carbonate, propylene carbonate, etc.

A catalyst for polycondensation which is used upon preparation of the polycarbonates may be chosen over a wide range and mention may be made of the same catalysts as used for the preparation of polyesters of [III] or [IV] described above. It is preferred that these catalysts are employed in a range of 5 to 500 ppm based on the whole polycarbonates.

As another method, there is also known a method which comprises reacting diols with phosgene or chloroformate.

A method for converting the ends of the polycarbonate diols into carboxyl groups is not particularly limited but a known method is applicable thereto. For example, polycarbonates having hydroxy groups at the ends thereof are reacted with acid anhydrides such as succinic anhydride, phthalic anhydride, etc. while heating thereby to convert the hydroxyl groups into the terminal carboxyl groups. Further in another method, the polycarbonates having hydroxy groups at the ends thereof are reacted with organic dicarboxylic acids while dehydration with heating thereby to convert the hydroxyl groups into the terminal carboxyl groups.

In general formula [VII], $R_5$ represents a divalent hydrocarbon residue. Concretely, an aliphatic hydrocarbon residue having 2 to 16 carbon atoms and/or an aromatic hydrocarbon residue having 6 to 16 carbon atoms are preferred. As sources for compounds capable of giving these residues, mention may be made of dicarboxylic acids such as adipic acid, azelaic acid, etc., in addition to succinic anhydride and phthalic anhydride described above.

In general formula [VII], $R_6$ is derived from organic dicarboxylic acids. The organic dicarboxylic acids are not particularly limited but exemplified by aliphatic dicarboxylic acids and aromatic dicarboxylic acids. Examples of aliphatic dicarboxylic acids include dicarboxylic acids having 4 to 54 carbon atoms such as glutaric acid, adipic acid, azelaic acid, pimelic acid, sebacic acid, dodecanedioic acid, tetradecanedioic acid, a dimeric acid, etc. Examples of the aromatic dicarboxylic acids are dicarboxylic acids having 8 to 20 carbon atoms such as isophthalic acid, terephthalic acid, phthalic acid, naphthalene dicarboxylic acid, etc. The aliphatic dicarboxylic acids, especially aliphatic dicarboxylic acids having 4 to 12 carbon atoms are preferred. These carboxylic acids may be used singly or in combination.

In the present invention, the units represented by general formulae [III] through [VI] may be present in segment A singly or may also be present in optional combinations of units [III] through [VI].

Further in the present invention, it is preferred that a molecular weight of segment A is in a range of 300 to 8,000, more preferably 500 to 5,000. When the molecular weight is less than 300, processabilities become poor and when it exceeds 8,000, transparency and dynamic efficiency are reduced.

The number average molecular weight of the polyamide copolymer according to the present invention is in a range of 5,000 to 250,000, preferably 20,000 to 150,000. When the molecular weight is less than 5,000, strength properties, flexing resistance and abrasion resistance are poor and when it exceeds 150,000, processabilities become poor.

Further in the present invention, there is a characteristic that a higher degree of resistance to hydrolysis and heat aging resistance can be achieved by incorporating compounds having at least one epoxy rings in the molecular thereof (epoxy compounds) into the polyamide copolymers described above and reacting them with each other, whereby compression set can be improved at the same time.

Such a characteristic may be obtained also by incorporating the epoxy compounds into conventional polyamides but in the combination with the specific polyamides of the present invention, the characteristic is markedly exhibited.

The compounds containing epoxy rings are not particularly limited as long as they are compounds having at least one epoxy ring in the molecule thereof. Representative examples of the epoxy compounds are monofunctional epoxy compounds such as phenyl glycidyl ether, styrene oxide, etc.; polyfunctional epoxy compounds such as ethyleneglycol diglycidyl ether, diethylene-glycol diglycidyl ether, propyleneglycol diglycidyl ether, bisphenol A diglycidyl ether, trimethylolpropane triglycidyl ether, glycerol triglycidyl ether, etc. These epoxy compounds may be used singly or as admixture thereof.

It is preferred that an amount of the epoxy compounds to be incorporated is approximately 0.2 to 15 wt % based on the polyamide. When the amount is less than 0.2%, other properties, for example, compression set, heat aging resistance and mechanical properties are not improved while resistance to hydrolysis can be improved. When more than difunctional epoxy compounds are employed, an increase in a molecular weight of the polyamide is noted and this is preferred in view of mechanical properties but when the amount of difunctional epoxy compound is too much, various physical properties become conversely poor. A more preferred amount of the epoxy compound to be incorporated is 1 to 10 wt% in the case of the monofunctional epoxy compound and 0.2 to 3 wt% in the case of the polyfunctional epoxy compound. In case that the monofunctional epoxy compound and the polyfunctional epoxy compound are used in combination, it is preferred that a ratio of the polyfunctional epoxy compound to the monofunctional epoxy compound to be used is approximately 20/100 or less. Particularly when the ratio is in a range of approximately 2/100 to 20/100, preferred results are noted in compression set, resistance to hydrolysis, heat aging resistance and mechanical properties.

The reaction between the polyamides and the epoxy compounds may be carried out, as far as the polyamides and the epoxy compounds are well mixed with each other, by incorporating the epoxy compounds into the fused polyamide copolymer or by incorporating the epoxy compounds into solutions of the polyamides. A reaction temperature may be chosen from various ranges depending upon that the reaction is carried out in a solution state or in a fused state, composition of the polyamides, etc. For example, in the solution state, the temperature is preferably at 100° C. or higher and in the fused state, the temperature may be one higher than the melting point of the polyamide used. Further the reaction may be carried out either in the presence or absence of a catalyst.

A time period at when the epoxy compound is to be incorporated may be any time after a later stage of polymerization of the polyamide. For example, it is possible to perform melt molding while incorporating the epoxy compound, at the time when the polyamide pelletized after completion of the polymerization is subjected to fabrication. The term "later stage of the polymerization" as used herein refers to a stage subsequent to the point of time when the organic diisocyanate component and the dicarboxylic acid component disappear by approximately 90%, preferably 95%. Even when the epoxy compound is incorporated at a time period when polymerization does not proceed sufficiently, resistance to hydrolysis is not exhibited so that good results cannot be obtained.

As such, a method for preparing the modified polyamide is not particularly limited but in the case of preparing the modified polyamide efficiently from an industrial viewpoint, it is particularly preferred to follow the following method.

That is, the method for preparing the desired modified polyamide comprises using a multi-screw extruder reactor as a reaction device, continuously feeding the organic diisocyanate component and the dicarboxylic acid component in the reactor, proceeding polymerization while eliminating by-produced carbon dioxide gas with heating under reduced pressure, continuously adding the epoxy compound at a later stage of the reaction and reacting them each other.

The reaction intermediate formed in the polyamide formation reaction herein has a great tackiness to metals and causes uneven mixing in the reactor so that the intermediate becomes a cause for forming gelled polyamide products. Accordingly, as the multi-screw extruder reactor used in the present invention, it is preferred to employ a co-rotating multi-screw extruder reactor equipped with an intermeshing screw including a kneading element.

A residence time of the reactor of this kind is mainly determined by an L/D value (wherein L is a screw length and D is a screw diameter). The greater the L/D value, the longer the residence time. However, to set L/D in a great value, there is a restriction from two points of a strength of screw shaft and a motor drive power load of screw. When the residence time is 2 to 3 minutes, the reactor is most balanced with costs.

On the other hand, in order to obtain excellent modified polyamide copolymers, it is preferred that the reaction time could be as long as possible (generally for about 5 minutes). Therefore, use of only one conventional multi-screw extruder reactor having a residence time for 2 to 3 minutes renders it difficult to obtain the modified polyamide copolymers of the present invention efficiently. Accordingly, in the present invention, it is important that two or more multi-screw extruder reactors are connected in series to ensure a sufficient residence time.

Major roles of a first reactor are to accelerate polymerization while preventing the reactive matters from adhesion to the screw and to eliminate carbon dioxide generated. For this reason, it is preferred to use a co-rotating multi-screw having excellent intermeshing properties. In order to accelerate the reaction, it is preferred to mix with a screw rotation equipped with a kneading element having an excellent mixing effect at a high speed of 100 rpm, preferably 200 rpm. Elimination of carbon dioxide is achieved with a progressive screw portion having vent holes. It is preferred that the vent holes are sucked with a vacuum pump. It is preferred that 80% or more carbon dioxide could be removed in the first reactor. When the amount is less than 80%, an amount of carbon dioxide to be removed in a second and subsequent reactors becomes large so that subsequent polymerization or epoxylation do not proceed efficiently.

Major roles of the second and subsequent reactors are to eliminate the remaining carbon dioxide and complete polymerization and reaction with the epoxy compound. Subsequent reactors may be any number but it is preferred that design is made to use one reactor due to controlling ability of the production process. The amount of carbon dioxide gas to be removed in the subsequent reactors is small so that it may be sufficient to provide several vent holes but operation with a vacuum pump is always unnecessary. At the point of the time when an amount of the dicarboxylic acid consumed reaches about 90%, preferably 95% or more, the epoxy compound preferably is fed to modify the polyamide. When the epoxy compound is added at the point of the time when polymerization does not proceed sufficiently, the dicarboxylic acid as a raw material of the polyamide reacts with the epoxy compound so that the polyamide having a high polymerization degree cannot be obtained and no excellent modified polyamide can be obtained.

In the first reactor and the subsequent reactors, their screw element combination and reaction temperature are both important factors. A ratio of kneading element is 10 to 50%, preferably 20 to 40%, based on the whole screws. In the case of 10% or less, mixing is insufficient, gelled products are produced in large quantities and the epoxy compound is not homogeneously mixed so that it is difficult to obtain the objective product. On the other hand, when the ratio exceeds 50%, strike-through and extrusion of the reactive matters become difficult or the removal of carbon dioxide is insufficient so that it is difficult to obtain the objective product.

With respect to the reaction temperature, it is preferred to control 5 or more sections independently in each reactor. The temperature of each section is preferably in a range of $(T+20)°$ C. to $(T+70)°$ C. wherein a flow initiation temperature of the reacting matters present is $T°$ C. When the temperature is lower than $(T+20)°$ C., the reactive matters are not in a melt state so that mixing is not thoroughly conducted and the product having minimized gels cannot be obtained. When the temperature is higher than $(T+70)°$ C., thermal decomposition begins so that the product having excellent physical properties cannot be obtained. The flow initiation temperature as used herein refers to a temperature at which the matters shows fluidity by observation with the naked eye.

The polyamide copolymer of the present invention is excellent in processabilities and heat resistance and can be easily molded by an injection molding machine, an extrusion molding machine, a blow molding machine, etc. The polyamide copolymer can be used as sheets, films, tubular hosepipes, roll gears, packing materials, insulation materials, belt laminate products, automobile parts, sporting goods, etc.

Additives such as colorants, fillers, antioxidants, ultraviolet light absorber and/or lubricants may be added to the polyamide copolymers of the invention.

Hereafter the present invention will be concretely described with reference to the examples below. In the examples, "parts" are all "parts by weight". A tensile strength was measured by punching a film having a thickness of 100 μm obtained by hot press at 270° C. with a dumbbell. A resistance to hydrolysis was evaluated by a jungle test. The jungle test was evaluated by a tensile strength keeping rate before and after the jungle test after allowing a film having a thickness of 100 μm to stand at 70° C. under a relative humidity of 95%. A heat aging resistance was evaluated by a keeping rate obtained by measurement of the tensile strength after keeping a film having a thickness of 100 μm in a gear oven at 150° C. for 5 days. A temperature dependency of melt flow property was evaluated by activated energy Ea (kcal/mol) of an apparent melt flow obtained by measuring a viscosity according to the temperature elevation method (hold, 185° C.×5 mins.; a temperature elevation rate, 5° C./min.; dice diameter×length=0.5 mmφ×5 mml; load, 20 kg) using hardening type flow tester, Model CFT-500, manufactured by Shimadzu Seisakusho, Ltd. The activated energy Ea (kcal/mol) of an apparent melt flow was calculated, after plotting a logarithm of a flow amount ratio in a correlationship to an absolute temperature, to the reciprocal number of the absolute temperature and determining its slope, by the following equation:

$$Ea = -2.303 \, R \cdot K$$

wherein R represents a gas constant (1.987 cal/deg.-mol).

With respect to the low temperature characteristics, the characteristics were evaluated by preparing a test piece from a film having a thickness of 0.2 mm of the copolymer of the present invention and measuring $T_\alpha$(° C.) with a direct reading type dynamic viscoelasticity measuring device, Vibron Model DDV-II (110HZ) made by Toyo Sokki K.K.

Further with respect to the transparency, polyamide sheets having a thickness of 10 mm of the present invention is put on characters. Sheets through which the characters are clearly legible, poorly legible and hardly legible were evaluated to be "A", "B" and "C", respectively.

Compression set was measured at 70° C. in accordance with ASTM D395.

EXAMPLES

Synthesis Example 1

In a reactor were charged 2.400 g (15.0 mols) of 2-methyl-1,8-octanediol and 2.781 g (19.05 mols) of adipic acid and esterification was initiated at 150° C. with stirring. The temperature was gradually elevated to 200° C. over about 3 hours to complete the esterification. At this stage, water was distilled out. Then, the reaction was accelerated while gradually reducing the pressure in the system. At the time when hydroxy groups at the ends almost disappeared, the reaction was terminated to give carboxy-telechelic polyester No. 1. As a result, an acid value was 112 KOH mg/g and an average molecular weight determined from the acid value was 1,000.

Further in chloroform-d solvent, $^1$H nuclear magnetic resonance spectrum was measured. Based on a standard of tetramethylsilane (TMS) as a control compound, hydrogen in the methyl group of 2-methyl-1,8l-octanediol, hydrogen in the methylene group adjacent the oxygen atom of 2-methyl-1,8-octanediol and hydrogen in the methylene group adjacent —C=O of adipic acid showed resonance peaks at 0.8 ppm, 3.9 ppm and 2.2 ppm, respectively.

Further carboxyl-telechelic polyester Nos. 2 through 10 described in Table 1 were obtained in a manner similar to the procedures described above.

SYNTHESIS EXAMPLE 2

Carboxyl-telechelic polyester No. 11 was obtained in a manner similar to Synthesis Example 1 except that 3-methyl-1,5-pentanediol was used as the diol component. As a result, an acid value was 114.5 KOH mg/g and an average molecular weight determined from the acid value was 980. Further in chloroform-d solvent, $^1$H nuclear magnetic resonance spectrum was measured. Based on a standard of tetramethylsilane (TMS) as a control compound, hydrogen in the methyl group of 3-methyl-1,5-pentanediol, hydrogen in the methylene group adjacent the oxygen atom of 3-methyl-1,5-pentanediol, hydrogen in the methylene group adjacent the carbonyl group of adipic acid and hydrogen at the terminal carboxylic acids showed resonance peaks at 0.8 ppm, 3.9 ppm, 2.2 ppm and 11.8 ppm, respectively.

Further carboxyl-telechelic polyester Nos. 12 through 13 described in Table 2 were obtained in a manner similar to the procedures described above.

SYNTHESIS EXAMPLE 3

After the content of a 3-necked Erlenmeyer flask of an inner volume of 500 ml equipped with a stirring device, a dropping funnel, an outlet and an inlet was fully substituted with dry nitrogen gas, 12.4 parts (0.2 mols) of ethylene glycol and 0.13 parts of butyl lithium were charged in the flask. While vigorously stirring 150 parts of β-methyl-δ-valerolactone were added to the mixture through the dropping funnel at once. An hour after, 200 g of water was added to discontinue the reaction. To the reaction mixture was added 200 g of toluene. After separating water by fractionation, the system was washed 3 times with water. Toluene and a trace amount of water were distilled off with an evaporator to give a viscous liquid. The liquid was charged in a separate flask having an inner volume of 500 ml together with 200 g of toluene and 42 g (0.42 mols) of succinic anhydride. The mixture was heated to 100° C. while stirring. The reaction was completed 4 hours after. Toluene was distilled off with an evaporator and the system was further purified by molecular distillation to give carboxyl-telechelic polyester No. 14. An acid value was 106.7 KOH mg/g and an OH value was 0.2 KOH mg/g and, an average molecular weight determined therefrom was 1050.

Further in chloroform-d solvent, $^1$H nuclear magnetic resonance spectrum was measured. Based on a standard of tetramethylsilane (TMS) as a control compound, hydrogen in the methyl group of β-methyl-δ-valerolactone, hydrogen in the methylene group adjacent the carbonyl group of β-methyl-δ-valerolactone, hydrogen in the methylene group adjacent the oxygen atom other than the carbonyl group and hydrogen at the terminal carboxylic acids showed resonance peaks at 0.9 ppm, 2.2 ppm, 4.1 ppm and 11.0 ppm, respectively.

Further carboxyl-telechelic polyester Nos. 15 through 16 described in Table 2 were obtained in a manner similar to the procedures described above.

SYNTHESIS EXAMPLE 4

In a nitrogen flow, a mixture of 1534 g (13 mols) of 1,6-hexanediol and 1568 g (12 mols) of diphenyl carbonate was heated and phenol was distilled at 190° C. out of the reaction system. After phenol was almost distilled off by gradually elevating the temperature to 210° to 220° C., the system was rendered in vacuum. The remaining phenol was completely distilled off at 210° to 220° C. in reduced pressure of 6 to 10 mmHg. As a result, polycarbonate diol showing an OH value of 62 KOH mg/g was obtained. In a flask were charged 1800 g of this polycarbonate diol and 210 g of succinic anhydride. The mixture was heated to 100° C. while stirring. The reaction was completed 4 hours after. The reaction mixture was purified by molecular distillation to give carboxyl-telechelic polyester No. 17. An acid value was 56 KOH mg/g and an average molecular weight determined therefrom was 2000.

Further carboxyl-telechelic polyester Nos. 18 through 23 described in Table 3 were obtained in a manner similar to Synthesis Example 4.

SYNTHESIS EXAMPLE 5

In a nitrogen flow, a mixture of 1,770 g (15 mols) of 1,6-hexanediol and 2,140 g (10 mols) of diphenyl carbonate was heated and phenol was distilled at 190° C. out of the reacation system. After phenol was almost distilled off by gradually elevating the temperature to 210° to 220° C., the system was rendered in vacuum. The remaining phenol was completely distilled off at 210° to 220° C. in reduced pressure of 6 to 10 mmHg. As a result, polycarbonate diol showing an OH value of 276 KOH mg/g was obtained. In a nitrogen flow, 2,030 g of this polycarbonate diol, 2,190 g of adipic acid and 0.5 g of tetraisopropoxy titanate as a catalyst were heated to react at 200° C. for 5 hours. The reaction was completed under reduced pressure of finally 1 mmHg to give carboxyl-telechelic polyester No. 24. An acid value was 95.9 KOH mg/g and an average molecular weight determined therefrom was 1,170.

Further carboxyl-telechelic polyester No. 25 described in Table 3 was obtained in a manner similar to Synthesis Example 5.

TABLE 1

| Carboxyl-Telechelic Polyester | | Synthesis Example | | | | | | | | | |
|---|---|---|---|---|---|---|---|---|---|---|---|
| | | No. 1 | No. 2 | No. 3 | No. 4 | NO. 5 | No. 6 | NO. 7 | No. 8 | No. 9 | No. 10 |
| Dicarboxylic Acid (mol %) | ADA | 100 | 100 | | | 100 | 100 | 100 | 100 | 5 | 5 |
| | AZA | | | 100 | 100 | | | | | 95 | 95 |
| Diol (mol %) | MOD | 100 | 40 | 100 | 60 | 20 | 50 | | | | |
| | ND | | 60 | | 40 | 80 | 30 | | | | |
| | MPD | | | | | | 20 | | | | |
| | HD | | | | | | | 100 | | | |
| | BD | | | | | | | | 100 | | 100 |
| | NPG | | | | | | | | | 100 | |
| Molecular Weight | | 1000 | 1200 | 1200 | 1200 | 1200 | 1000 | 1030 | 1200 | 2200 | 2350 |

Notes)
ADA: adipic acid
AZA: azelaic acid
MPD: 3-methyl-1,5-pentanediol
BD: 1,4-butanediol
MOD: 2-methyl-1,8-octanediol
ND: 1,9-nonanediol
HD: 1,6-hexanediol
NPG: neopentyl glycol

TABLE 2

| Carboxyl-Tetechelic Polyester | | Synthesis Example | | | | | |
|---|---|---|---|---|---|---|---|
| | | No. 11 | No. 12 | No. 13 | No. 14 | NO. 15 | No. 16 |
| Polycondensation System | | | | | | | |
| Dicarboxylic Acid (mol %) | ADA | 100 | 100 | | | | |
| | AZA | | | 100 | | | |
| Diol (mol %) | MPD | 100 | 75 | 100 | | | |
| | HD | | 25 | | | | |
| Ring-Opening Polymerization System | | | | | | | |
| | MVL (mol %) | | | | 100 | 60 | |
| | CL (mol %) | | | | | 40 | 100 |
| Molecular Weight | | 980 | 1010 | 1000 | 1050 | 1000 | 1050 |

Abbreviations:
CL: ε-caprolactone
MVL: β-methyl-δ-valerolactone

TABLE 3

| | | Synthesis Example | | | | | | | | |
|---|---|---|---|---|---|---|---|---|---|---|
| | | No. 17 | No. 18 | No. 19 | No. 20 | NO. 21 | No. 22 | No. 23 | No. 24 | No. 25 |
| Carboxyl-Telechelic PC | | | | | | | | | | |
| PC Diol | | | | | | | | | | |
| Glycol (mol %) | MOD | | | 50 | 20 | | 80 | | | 10 |
| | ND | | 100 | 50 | 80 | | 20 | 60 | | 90 |
| | HD | 100 | | | | 95 | | | 100 | |
| | MPD | | | | | 5 | | 40 | | |
| Molecular Weight | | 800 | 1050 | 1000 | 950 | 1100 | 1350 | 1050 | 400 | 530 |
| Carboxylic Acid (mol%) | SAH | 100 | 100 | 100 | 100 | | 100 | | | |
| | PAH | | | | | 100 | | 100 | | |
| | AZA | | | | | | | | | 100 |
| | ADA | | | | | | | | 100 | |
| Molecular Weight | | 2000 | 1250 | 1200 | 1050 | 1400 | 1550 | 1350 | 1170 | 1370 |

PC: polycarbonate
PAH: phthalic anhydride
SAH: succinic anhydride

EXAMPLE 1

In a beaker were charged 0.2 mols (200 g) of carboxyl-telechelic polyester prepared in Synthesis Example 1 and 0.3 mols (56.4 g) of azelaic acid. The mixture was heated to 120° C. to melt them followed by dehydration for 30 minutes under reduced pressure. Further 125 g of (0.5 mols) of melted 4,4'-diphenylmethanediisocyanate was added to the mixture at once followed by vigorous stirring for about 20 minutes. At this point of time, 70% of the isocyanate was lost.

This prepolymer was charged in Plastograph (manufactured by Bravender Co.) kept at 260° C. to accelerate polymerization. After kneading for 20 minutes, the mixture was taken out to give copolymer No. 26. As a result of measurement by GPC, the obtained block copolymer No. 26 had a number average molecular weight of 40,200 (calculated as styrene). Evaluation was made on various properties. The results obtained are shown in Table 4.

The copolymer of the present invention obtained showed good results in all of resistance to hydrolysis, tensile elongation, processabilities, heat aging resistance, transparency and low temperature characteristics.

40,000. Evaluation was made on various efficiencies. The results obtained are shown in Tables 4 and 5.

With respect to the copolymers obtained in Examples 2 through 18, good results as shown in Tables 4 and 5 were obtained. However, in the cases of using carboxyl-telechelic polyesters containing no repeating units essential to the present invention (Comparative Examples 1 to 4), good results were not obtained in all physical properties of resistance to hydrolysis, low temperature characteristics, heat aging resistance, processabilities and transparency.

TABLE 4

| Example | Copolymer | Organic Diisocyanate Component | Dicarboxylic Acid Component Dicarboxylic Acid | Dicarboxylic Acid Component Carboxyl-telechelic Polyester No. | Tensile Strength (kg/cm$^2$) | processabilities Apparent Activated Energy of Melt Flow (Kcal/mol) | Keeping Rate of Heat Aging Resistance Strength (%) | Keeping Rate of Hydrolysis Resistance Strength (%) | Low Temperature Characteristics $T_\alpha$(°C.) | Transparency |
|---|---|---|---|---|---|---|---|---|---|---|
| 1 | 26 | MDI | AZA | 1 | 520 | 30 | 100 | 97 | −45 | A |
| 2 | 27 | TDI | AZA | 1 | 500 | 26 | 100 | 97 | −43 | A |
| 3 | 28 | PDI | AZA | 1 | 530 | 33 | 100 | 97 | −47 | A |
| 4 | 29 | MDI | AZA | 2 | 500 | 30 | 100 | 96 | −43 | A |
| 5 | 30 | MDI | AZA | 3 | 510 | 30 | 100 | 96 | −52 | A |
| 6 | 31 | MDI | SbA | 4 | 500 | 30 | 100 | 98 | −54 | A |
| 7 | 32 | MDI | AZA/ADA* | 6 | 530 | 25 | 95 | 90 | −40 | A |
| 8 | 33 | MDI | AZA/ADA** | 2 | 520 | 25 | 100 | 98 | −42 | A |
| 9 | 34 | MDI | AZA | 5 | 540 | 33 | 98 | 97 | −43 | A |
| 10 | 35 | MDI | AZA/IPA*** | 2 | 525 | 32 | 100 | 98 | −43 | A |

AZA/ADA* = 7/3 (molar ratio)
MDI: 4,4'-diphenylmethane diisocyanate
TDI: tolylene diisocyanate
PDI: phenylene diisocyanate
AZA/ADA** = 1/1 (molar ratio)
Sba: sebacic acid
IPA: isophthalic acid
AZA/IPA*** = 7/3 (molar ratio)

TABLE 5

| | Thermoplastic Elastomer | Organic Diisocyanate Component | Dicarboxylic Acid Component Aliphatic Dicarboxylic Acid | Dicarboxylic Acid Component Carboxyl-telechelic Polyester No. | Tensile Strength (kg/cm$^2$) | Elongation (%) | processabilities Apparent Activated Energy of Melt Flow (Kcal/mol) | Keeping Rate of Heat Aging Resistance Strength (%) | Keeping Rate of Hydrolysis Resistance Strength (%) | Transparency |
|---|---|---|---|---|---|---|---|---|---|---|
| Example | | | | | | | | | | |
| 11 | 36 | MDI | AZA | 11 | 490 | 470 | 30 | 96 | 70 | A |
| 12 | 37 | TDI | AZA | 11 | 500 | 480 | 32 | 98 | 69 | A |
| 13 | 38 | MDI | AZA | 12 | 520 | 480 | 33 | 97 | 68 | A |
| 14 | 39 | MDI | AZA | 13 | 470 | 445 | 26 | 95 | 72 | A |
| 15 | 40 | MDI | AZA/ADA* | 13 | 490 | 470 | 28 | 96 | 71 | A |
| 16 | 41 | MDI | AZA | 11/7** | 490 | 530 | 32 | 95 | 60 | A-B |
| 17 | 42 | MDI | AZA | 14 | 480 | 540 | 28 | 97 | 72 | A |
| 18 | 43 | MDI | AZA | 15 | 510 | 510 | 30 | 96 | 63 | A-B |
| Comparative Example | | | | | | | | | | |
| 1 | 44 | MDI | AZA | 7 | 480 | 500 | 46 | 93 | 30 | C |
| 2 | 45 | MDI | AZA | 16 | 485 | 480 | 48 | 93 | 34 | C |
| 3 | 46 | MDI | AZA/ADA*** | 10 | 475 | 500 | 66 | 90 | 25 | B |
| 4 | 47 | MDI | AZA/ADA*** | 9 | 480 | 450 | 60 | 94 | 45 | A |

AZA/ADA* = 7/3 (molar ratio)
No. 11/No. 17** = 1/1 (molar ratio)
AZA/ADA*** 1/1 (molar ratio)

tics.

EXAMPLES 2 TO 18 AND COMPARATIVE EXAMPLES 1 TO 4

Copolymer Nos. 27 through 47 were obtained in a manner similar to Example 1 except for using compositions shown in Tables 4 and 5. Number average molecular weights of the copolymers obtained were 38,000 to

EXAMPLE 19

In a beaker were charged 0.2 mols (200 g) of carboxyl-telechelic polycarbonate prepared in Synthesis Example 17 and 0.3 mols (56.4 g) of azelaic acid. The mixture was heated to 120° C. to melt them followed by dehydration for 30 minutes under reduced pressure. Further 125 g of (0.5 mols) of melted 4,4'-diphenylmethanediisocyanate was added to the mixture at once followed by vigorous stirring for about 10 minutes.

This prepolymer was charged in Plastograph (manufactured by Bravender Co.) kept at 260° C. to accelerate polymerization. After kneading for 10 minutes, the mixture was taken out to give a light yellow transparent rubbery substance No. 48. An inherent viscosity of this substance was 0.95 dl/g at 30° C. in N-methyl-2-pyrrolidone. Further a number average molecular weight calculated as styrene was 80,600. In infrared spectrum, this substance showed absorptions based on an amide group at 1650 cm$^{-1}$ and 1530 cm$^{-1}$ and absorptions based on polycarbonate at 1760 cm$^{-1}$ and 1250 cm$^{-1}$. In $^1$H nuclear magnetic resonance spectrum, hydrogen in the amide group and hydrogen in the methylene group adjacent the carbonate showed resonance peaks at 9.7 ppm and 4.0 ppm, respectively. It is noted that the obtained rubbery substance was a polycarbonate polyamide copolymer. Evaluation was made on various properties. The results obtained are shown in Table 6.

The polycarbonate polyamide showed good results in all of resistance to hydrolysis, tensile strength, heat aging resistance, transparency and low temperature characteristics.

EXAMPLES 20 TO 29

Copolymer Nos. 49 through 58 were obtained in a manner similar to Example 19 except for using compositions shown in Table 6. Number average molecular weights of the copolymers obtained were 60,000 to 90,000. Evaluation was made on various efficiencies. The results obtained are shown in Table 6.

With respect to the copolymers obtained in Examples 20 through 29, good results were obtained in all of dynamic efficiencies, heat aging resistance, resistance to hydrolysis and transparency. Further the copolymers obtained in Examples 23, 24, 26 and 27 showed good results also in low temperature softness.

EXAMPLE 30

Polycarbonate polyamide copolymer No. 59 having a molecular weight of 80,000 was obtained in a manner similar to Example 19 except that 0.1 mol (120 g) of carboxyl-telechelic polycarbonate No. 19 and 0.4 mols (75.2 g) of azelaic acid were used. As a result, the copolymer has excellent tensile strength, heat aging resistance, resistance to hydrolysis and transparency as shown in Table 6.

EXAMPLE 31

Polycarbonate polyamide copolymer No. 60 having a molecular weight of 85,000 was obtained in a manner similar to Example 19 except that 0.4 mols (480g) of carboxyl-telechelic polycarbonate No. 19 and 0.1 mol (18.8g) of azelaic acid were used. As a result, the copolymer has excellent tensile strength, heat aging resistance, resistance to hydrolysis and transparency as shown in Table 6.

TABLE 6

| Example | Copolymer | Organic Diisocyanate Component | Dicarboxylic Acid Component (mol) | | Tensile Strength (kg/cm$^2$) | Keeping Rate of Heat Aging Resistance Strength (%) | Keeping Rate of Hydrolysis Resistance Strength (%)*** | Low Temperature Softness $T_\alpha$(°C.) | Transparency |
|---|---|---|---|---|---|---|---|---|---|
| | | | Dicarboxylic Acid | Carboxyltelechelic Polycarbonate No. | | | | | |
| 19 | 48 | MDI | AZA (0.3) | 17 (0.2) | 540 | 100 | 94 | −12 | A |
| 20 | 49 | TDI | AZA (0.3) | 17 (0.2) | 520 | 100 | 94 | −11 | A |
| 21 | 50 | PDI | AZA (0.3) | 17 (0.2) | 550 | 100 | 94 | −13 | A |
| 22 | 51 | MDI | SbA (0.3) | 18 (0.2) | 560 | 100 | 97 | −17 | A |
| 23 | 52 | MDI | AZA (0.3) | 19 (0.2) | 530 | 100 | 98 | −30 | A |
| 24 | 53 | MDI | AZA (0.3) | 20 (0.2) | 510 | 100 | 99 | −35 | A |
| 25 | 54 | MDI | AZA (0.3) | 21 (0.2) | 540 | 100 | 95 | −21 | A |
| 26 | 55 | MDI | AZA/ADA* (0.3) | 22 (0.2) | 550 | 100 | 99 | −32 | A |
| 27 | 56 | MDI | AZA (0.3) | 23 (0.2) | 545 | 100 | 98 | −27 | A |
| 28 | 57 | MDI | AZA (0.3) | 24 (0.2) | 550 | 97 | 89 | −19 | A |
| 29 | 58 | MDI | AZA/ADA* (0.3) | 25 (0.2) | 545 | 96 | 87 | −34 | A |
| 30 | 59 | MDI | AZA (0.4) | 19 (0.1) | 650 | 100 | 99 | −26 | A |
| 31 | 60 | MDI | AZA (0.1) | 19 (0.4) | 480 | 97 | 97 | −39 | A |
| Comparative Example 3 | 47 | MDI | AZA/ADA** (0.3) | 9 (0.2) | 480 | 90 | 15 | −22 | A |
| Comparative Example 4 | 46 | MDI | AZA/ADA** (0.3) | 10 (0.2) | 470 | 88 | 12 | −32 | B |

AZA/ADA* = 7/3 (molar ratio)
***: allowed to stand for 56 days
AZA/ADA** = −1/1 (molar ratio)

EXAMPLE 32

In a beaker were charged carboxyl-telechelic polyester (196 parts, 0.2 mols) prepared in Synthesis Example 2 and azelaic acid (56.4 parts, 0.3 mols). The mixture was heated to 120° C. to melt them followed by dehydration for 30 minutes under reduced pressure. Then melted 4,4'-diphenylmethanediisocyanate (125 parts, 0.5 mols) was added to the mixture at once followed by vigorous stirring for about 20 minutes. At this point of time, 70% of the isocyanate was lost.

This prepolymer was charged in Plastograph (manufactured by Bravender Co.) kept at 260° C. to accelerate polymerization. At the time when 96% or more isocyanate and carboxylic acid were lost about 10 minutes after the charge in the Plastograph, phenyl glycidyl ether (19 parts) and Epicoat 828 (manufactured by Petrochemical Shell Co., Ltd.) (2 parts) were added to the mixture. After kneading for further 10 minutes, the mixture was taken out to give modified polyamide No. 61. Evaluation was made on various properties. The results obtained are shown in Table 7.

The modified polyamide obtained showed good results in all of tensile strength, tensile elongation, compression set, resistance to hydrolysis and heat aging resistance, as is evident from Table 7.

were obtained, although the results were not beyond those obtained in Examples 33 through 37.

TABLE 7

| | Polyamide | Organic Dissocyanate Component | Dicarboxylic Acid | Dicarboxylic Acid Component Carboxyl-telechelic Polymer | | Epoxy Compound | Inherent Viscosity (dl/g) | Tensile Strength (kg/cm$^2$) | Elongation (%) | Compression Set (%) | Keeping Rate of Hydrolysis Resistance Strength (%) | Keeping Rate of Heat Resistance Strength[5] (%) |
|---|---|---|---|---|---|---|---|---|---|---|---|---|
| | | | | No. | Molecular Weight | | | | | | | |
| Example | | | | | | | | | | | | |
| 32 | 61 | MDI | AZA | 11 | 980 | PGE[3] 5 PHR Epicoat 828, 0.5 PHR | 0.83 | 530 | 480 | 38 | 88 | 98 |
| 33 | 62 | TDI | AZA | 11 | 980 | PGE 5 PHR | 0.82 | 530 | 470 | 42 | 91 | 98 |
| 34 | 63 | MDI | AZA/ADA*[1] | 11 cPHAZ[2] | 980 1020 | PGE 5 PHR Epicoat 828, 0.5 PHR | 0.83 | 530 | 480 | 39 | 87 | 96 |
| 35 | 64 | MDI | AZA | 2 | 1200 | PGE 3 PHR | 0.90 | 500 | 530 | 40 | 90 | 97 |
| 36 | 65 | MDI | AZA | 14 | 1050 | PGE 5 PHR Epicoat 828, 0.5 PHR | 0.84 | 500 | 540 | 42 | 92 | 98 |
| 37 | 66 | MDI | AZA | 15 | 1000 | PGE 5 PHR Epicoat 828, 0.5 PHR | 0.82 | 540 | 500 | 40 | 90 | 97 |
| Comparative Example | | | | | | | | | | | | |
| 5 | 66 | MDI | AZA | cPHAZ | 1020 | PGE 5 PHR EGDGE[4] 0.5 PHR | 0.85 | 520 | 460 | 36 | 84 | 95 |
| 6 | 67 | MDI | AZA | cPHAZ | 1020 | PGE 5 PHR | 0.77 | 510 | 455 | 43 | 83 | 95 |
| 7 | 68 | MDI | AZA | 7 | 1030 | PGE 5 PHR | 0.81 | 550 | 520 | 39 | 85 | 95 |
| 8 | 69 | MDI | AZA/ADA*[1] | — | — | PGE 5 PHR | 1.2 | 750 | 110 | — | 99.0 | 99.5 |

[1] AZA/ADA = 7/3 (molar ratio)
[2] cPHAZ: carboxyl-telechelic polyhexylene azelate
[3] PGE: phenylglycidyl ether
[4] EGDGE: ethyleneglycol diglycidyl ether
[5] maintained for 10 days

EXAMPLES 33 THROUGH 37

Modified polyamide Nos. 33 to 37 were obtained in a manner similar to Example 19 except for using compositions and ratios shown in Table 7. With respect to the modified polyamides obtained in Examples 33 to 37, good results were also obtained likewise Example 32 in all of tensile strength, tensile elongation, compression set, resistance to hydrolysis and heat aging resistance.

COMPARATIVE EXAMPLES 5 THROUGH 8

In a beaker were charged carboxyl-telechelic polyester (0.2 mols) shown in Table 7 and dicarboxylic acid (0.3 mols). The mixture was heated to 120° C. to melt them followed by dehydration for 30 minutes under reduced pressure. Then melted 4,4'-diphenylmethanediisocyanate (0.5 mols) was added to the mixture at once followed by vigorous stirring for about 20 minutes. At this point of time, 70% of the isocyanate was lost.

This prepolymer was charged in Plastograph (manufactured by Bravender Co.) kept at 260° C. to accelerate polymerization. After kneading for 20 minutes, the mixture was taken out to give various polyamides.

Each of the obtained polyamides was continuously charged in a twin screw extruder. Among 3 zones of the front, intermediate and rear zones of the extruder, phenyl glycidyl ether (5pHR) and Epicoat 828 (0.5pHR) were continuously fed between the front and intermediate zones. The temperature in the intermediate zone was set to 240° C. higher than the melting point of the polyamide. The polymer was continuously extruded into water in a strand form and then molded into pellets with a pelletizer to give modified polyamide Nos. 67 and 68. As a result, relatively good physical properties

EXAMPLE 38

In a storage tank kept at 90° C. and equipped with a stirrer were charged 80.2 parts of polyester dicarboxylic acid having a mean molecular weight of 1143 obtained from 3-methyl-1,5-pentanediol and adipic acid and 19.8 parts of azelzic acid. The mixture was mixed in a nitrogen atmosphere to make a fully transparent dicarboxylic acid mixture.

Separately, 4,4'-diphenylmethane diisocyanate was charged in a storage tank kept at 50° C. and stored in a nitrogen atmosphere.

The dicarboxylic acid mixture at 90° C. was continuously fed in an intermeshing twin screw extruder reactor equipped with a kneading element (manufactured by Research Laboratories of Plastic Technology Corp.) at a rate of 69.5 g/min. with a metering pump having a rotation accuracy of ±2/100.

On the other hand, 4,4'-diphenylmethane diisocyanate of 50° C. was continuously fed in the reactor at a rate of 30.5 g/min. with a metering pump having a rotation accuracy of ±2/100.

As a polyamide modifying agent, 4 parts of phenyl glycidyl ether were added through a vent hole (section 4) of a second reactor in which 95% or more isocyanate and carboxylic acid were considered to be lost.

The reactor consisted of two screw extruder reactors connected with each other in series, which were both intermeshing co-rotating twin screw extruders including kneading elements.

Both reactors had a screw diameter (D) and a screw length (L) of 30 mm and 1080 mm, respectively. Ratios of the kneading elements were 23% in the first reactor and 34% in the second reactor.

Each reactor is divided into 6 sections and numbered section 1 to section 6, counted from the raw material feeding opening. Sections 3, 4, 5 and 6 in the first reactor are vent holes to remove $CO_2$ and in the second reactor, section 3 is a vent hole to remove $CO_2$ and section 4 is an opening for incorporating the epoxy compound and section 6 is a vent hole to remove all gases. As the zone in which the reaction is completed, one with a nozzle having a diameter of 3.0 mm was used. Each reaction temperature is as shown in Table 8.

TABLE 8

| Section | 1 | 2 | 3 | 4 | 5 | 6 |
|---|---|---|---|---|---|---|
| First Reactor | 170 | 220 | 280 | 280 | 280 | 270 |
| Second Reactor | 220 | 240 | 280 | 280 | 280 | 250 |

Rotation number of screw: 250 rpm (in both reactors)

otherwise treated in a manner similar to Example 38 to give modified polyamide No. 73.

COMPARATIVE EXAMPLE 10

In the procedure of Example 38, reaction was carried out after omitting the second reactor. From polyamide extruded through an extruder head of the reactor, evolution of $CO_2$ was noted because the reaction was not completed. Strands could not be stably withdrawn.

COMPARATIVE EXAMPLE 11

In the procedure of Example 38, reaction was carried out using screws containing no kneading elements in both of the first and second reactors. In the reaction product extruded from an extruder head of the second reactor, evolution of $CO_2$ was partly noted so that strands could not be stably withdrawn. When the withdrawn matter was dissolved in dimethylacetamide, many insoluble gelled matters were detected.

TABLE 9

| | Organic Diisocyanate Component | Dicarboxylic Acid | Dicarboxylic Acid Component Carboxyltelechelic Polyester (mean molecular weight) | Epoxy Compound | Inherent Viscosity (dl/g) | Tensile Strength (kg/cm$^2$) | Elongation (%) | Gel percent (%) | Hydrolysis Resistance (%) | Heat Aging Resistance (%) | Number of Reactor | Ratio of Kneading Element in Screw (%) |
|---|---|---|---|---|---|---|---|---|---|---|---|---|
| Example | | | | | | | | | | | | |
| 38 | MDI | AZA | cPMPA* (1143) | PGE | 1.02 | 560 | 450 | 0.07 | 93 | 98 | 2 | 28.5 |
| 39 | MDI | AZA | cPMPA* (987) | PGE | 0.98 | 540 | 470 | 0.06 | 90 | 95 | 2 | 28.5 |
| 40 | MDI | AZA | cPCL** (1020) | PGE | 0.84 | 500 | 510 | 0.03 | 88 | 95 | 2 | 28.5 |
| Comparative Example | | | | | | | | | | | | |
| 9 | MDI | AZA | cPMPA* (1143) | none | 0.56 | impossible measure | impossible measure | 21.5 | — | — | 1 | 28.5 |
| 10 | MDI | AZA | cPMPA* (1143) | none | impossible measure | impossible measure | imposible measure | 30.5 | — | — | 2 | 0 | cPMPA: polymethylpentane adipate having carboxyl groups at both ends
cPCL: polycaprolactone having carboxyl groups at both ends

EXAMPLE 39

In a storage tank kept at 90° C. and equipped with a stirrer were charged 60.6 parts of polyester dicarboxylic acid having a mean molecular weight of 987 obtained from 3-methyl-1,5-pentandiol and adipic acid and 39.4 parts of azelaic acid. The mixture was mixed in a nitrogen atmosphere to make a fully transparent dicarboxylic acid mixture. This dicarboxylic acid mixture and 4,4'-diphenylmethane diisocyanate were continuously fed at rotation rates of 89.4 g/min. and 60.6 g/min., respectively and otherwise treated in a manner similar to Example 37 to give modified polyamide No. 72.

COMPARATIVE EXAMPLE 9

In a storage tank kept at 90° C. and equipped with a stirrer were charged 72.4 parts of polyester dicarboxylic acid having a mean molecular weight of 1020 obtained from polycaprolactone and 27.6 parts of azelaic acid. The mixture was mixed in a nitrogen atmosphere to make a fully transparent dicarboxylic acid mixture. This dicarboxylic acid mixture and 4,4'-diphenylmethane diisocyanate were continuously fed at rotation rates of 97.6 g/min. and 52.4 g/min., respectively and

What is claimed is:

1. A polyamide copolymer, comprising repeating units having the formula (I) and (II):

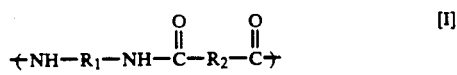

wherein a repeating unit of formula (II) comprises at least 10 mol % of said copolymer, said copolymer having a number average molecular weight of 5,000 to 250,000 and wherein $R_1$, $R'_1$ and $R_2$, which are the same or different, each represents a hydrocarbon residue and A represents a segment containing at least one repeating unit having the formula (III), (IV) or (V):

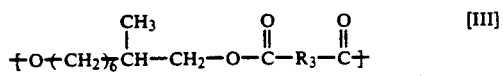

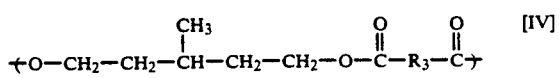

-continued

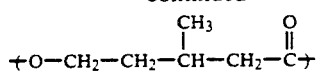

wherein $R_3$ represents a hydrocarbon residue.

2. The polyamide copolymer as claimed in claim 1, wherein $R_3$ is a hydrocarbon residue of 4 to 12 carbon atoms.

3. The polyamide copolymer as claimed in claim 1, wherein $R_1$ or $R'_1$ or both are an aromatic hydrocarbon residue having 6 to 20 carbon atoms.

4. The polyamide copolymer as claimed in claim 1, wherein $R_1$ or $R'_1$ or both are at least one aromatic hydrocarbon residue selected from the group having the formulae:

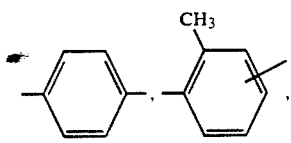

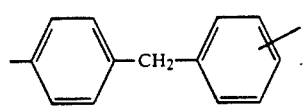

5. A polyamide copolymer as claimed in claim 4 wherein $R_1$ or $R'_1$ or both are an aromatic hydrocarbon residue represented by the formula below:

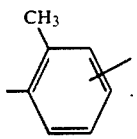

6. The polyamide copolymer as claimed in claim 4, wherein $R_1$ or $R'_1$ or both are an aromatic hydrocarbon residue represented by the formula:

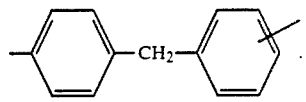

7. The polyamide copolymer as claimed in claim 1, wherein $R_2$ is an aliphatic hydrocarbon residue having 4 to 12 carbon atoms.

8. The polyamide copolymer as claimed in claim 7, wherein $R_2$ is a hydrocarbon residue of a dicarboxylic acid selected from the group consisting of adipic acid, azelaic acid and sebacic acid.

9. The polyamide copolymer as claimed in claim 1 wherein $R_3$ is an aliphatic hydrocarbon residue having 4 to 12 carbon atoms.

10. The polyamide copolymer as claimed in claim 9, wherein $R_3$ is a hydrocarbon residue of adipic acid or azelaic acid or both.

11. A polyamide copolymer as claimed in claim 1 wherein segment A is a residue containing a repeating unit shown by [III] and a repeating unit shown by [X] below:

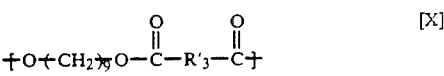

wherein $R_3$ and $R'_3$ are a hydrocarbon residue which is the same or different, and a molar ratio of [III] to [X]([III]/[X]) is 10/90 to 60/40.

12. The polyamide copolymer as claimed in claim 1 wherein said A contains at least 5 mol % of the repeating unit shown by formula [III].

13. A polyamide copolymer as claimed in claim 1 wherein said A contains at least 50 mol % of the repeating unit shown by formula [IV].

14. A polyamide copolymer as claimed in claim 1 wherein said A contains at least 30 mol % of the repeating unit shown by formula [V].

15. The polyamide copolymer as claimed in claim 1 wherein A is a residue of a polyester having a molecular weight of 300 to 8,000.

16. The polyamide copolymer as claimed in claim 1 wherein said number average molecular weight is 5,000 to 150,000.

* * * * *